Feb. 2, 1971 J. BAUMOEL 3,560,863
SETTABLE TIMER FOR SELECTIVELY DETERMINING THE DELAY EXHIBITED BY A TIME DELAY UNIT HAVING A CHARACTERISTIC DELAY SUBJECT TO VARIATION
Filed April 10, 1968 3 Sheets-Sheet 1

INVENTOR.
JOSEPH BAUMOEL
BY
OSTROLENK, FABER, GERB & SOFFEN
ATTORNEYS

SETTABLE TIMER FOR SELECTIVELY DETERMINING THE DELAY EXHIBITED BY A TIME DELAY UNIT HAVING A CHARACTERISTIC DELAY SUBJECT TO VARIATION

Filed April 10, 1968 3 Sheets-Sheet 2

INVENTOR.
JOSEPH BAUMOEL

BY

OSTROLENK, FABER, GERB & SOFFEN
ATTORNEYS

INVENTOR.
JOSEPH BAUMOEL
BY
OSTROLENK, FABER, GERB & SOFFEN
ATTORNEYS

United States Patent Office 3,560,863
Patented Feb. 2, 1971

3,560,863

SETTABLE TIMER FOR SELECTIVELY DETERMINING THE DELAY EXHIBITED BY A TIME DELAY UNIT HAVING A CHARACTERISTIC DELAY SUBJECT TO VARIATION

Joseph Baumoel, Jericho, N.Y., assignor to Controlotron Corporation, Farmingdale, N.Y., a corporation of New York Filed Apr. 10, 1968, Ser. No. 720,110
Int. Cl. G01r *29/02;* H03k *5/00*
U.S. Cl. 328—129 12 Claims

ABSTRACT OF THE DISCLOSURE

An electronic time delay device is combined with a time delay setter in a manner such that the time delay period begins upon the physical separation of the time delay device from the setter. The time delay setter includes means for automatically determining the parameters of the electrical elements of the time delay device and means for compensating for the variations in the electronic time delay device from predetermined reference characteristics.

BACKGROUND OF THE INVENTION

Figure 1:
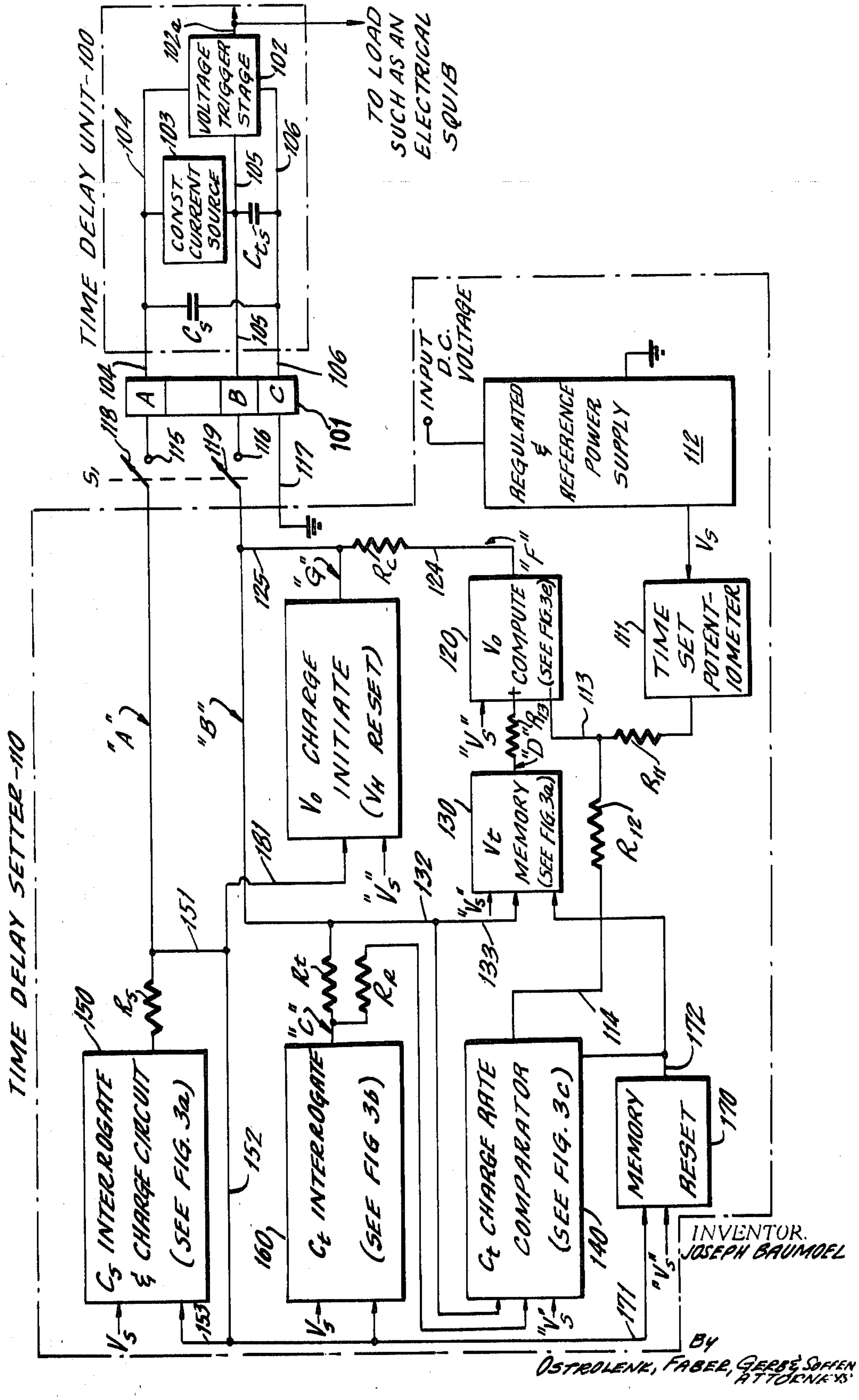

This invention relates to electronic time delays and is more particularly concerned with electronic time delay devices combined with a time delay setter where the time delay setter may be used to selectively and accurately set the time delay even though the electrical characteristics of the time delay devices to be used with the time delay setter vary from one time delay device to another.

Many situations today call for a precise time coordinated response to a preestablished condition or event. Very often it is necessary to provide this time coordination with a predetermined and exact time delay. One type of situation in which such time coordination and time delay are necessary occurs in the discharge of personnel and equipment from aircraft. In such application, it is necessary that after a predetermined length of time, depending upon such factors as speed, attitude and altitude of the aircraft, such devices as parachute openers, sono buoys, military stores, etc., be activated in order to protect the personnel and equipment.

In such situations such as those mentioned above, it is exceedingly difficult to provide precise time delay devices. Varrying environmental conditions under which such devices are used, aging and other causes of change in the parameters of the electrical components of the time delay devices are several reasons for such difficulty. Furthermore, the complexity of the problem of providing precise time delay devices is made more difficult by the fact that the time delay must be selectively variable to take into account numerous other variable factors—attitude, speed and altitude of aircraft, for example.

One solution to the problem of providing a precise time delay is to provide a device having precision made electrical elements and to highly isolate these elements from environmental conditions. Obviously, such a solution is not desirable because of the great expense in manufacturing such time delay devices. Furthermore, making such device selectively variable in time delay would materially add to the cost of the devices.

Even if one does employ such precise time delay devices, a problem remains as to the means for selectively varying the time delay. The means for varying the time delay or the time delay setter will be an expensive precision instrument and it will, therefore, be desirable to detach the time delay setter from the time delay device so that it will not be damaged as by falling to the ground and it may thereafter be reused. This desirable characteristic of having a time delay setter which is detachable from the time delay device and usable with other time delay devices presents problems in that the inherent electrical characteristics of the time delay devices vary from one time delay device to another. Thus, a time delay setter manufactured to set the time delay of one device may not operate properly with another device. Furthermore, if one is satisfied with merely detaching the time delay setter for protection against its damage and not to use it with other time delay devices, the problem still arises of matching the time delay setter with its detached mating time delay device.

The present invention provides a time setting device for use with an electronic time delay device whereby the time setting device may be used to selectively and accurately set the time delay of time delay devices even though :he characteristics of the electrical elements of the time delay device vary from one unit to another.

In one preferred embodiment of the instant invention, a time setter is provided for use with a time delay unit where the time delay unit consists of a capacitor which is charged to a predetermined voltage to trigger a voltage responsive stage and thereby provide the output operating signal (e.g. to a parachute opener). The time delay setter of the instant invention is provided with means for determining the charging rate of the capacitor of the particular time delay unit to which it is connected, means for determining the trigger voltage of the particular time delay unit, and means for computing and imposing an initial voltage condition on the capacitor of the time delay unit so that the time delay unit will operate with precisely the time delay set by the time delay setter.

As can be seen from the above description of the preferred embodiment of the instant invention, a time delay setter is provided which may be used with any of a plurality of differing characteristic time delay units to precisely and accurately set the time delay.

It is, therefore, one object of the instant invention to provide a time delay setter capable of use with time delay units of varying characteristics.

It is another object of the instant invention to provide a time delay setter which may be used with a plurality of relatively inexpensvie time delay units as a result of the ability to use non-precision elements in the time delay units since the time delay setter compensates for any variations in the characteristics of the time delay units.

It is another object of the instant invention to provide a time delay setter and time delay unit for use in such devices as parachute openers and other droppable or launchable stores.

Another object of the instant invention is to provide an extremely high speed time delay setter whereby the time delay setter may be connected to the time delay unit only a few milliseconds before the time delay unit is to separate, and still accurately set the time delay.

Another object of the instant invention is to provide a time delay setter and time delay unit especially suitable for use with a parachute opener in that the time delay unit provides an output voltage a predetermined time after the separation of the time delay setter and the time delay unit. The voltage must be of sufficient magnitude to provide the high energy necessary to operate electrical squibs.

Figure 3A:
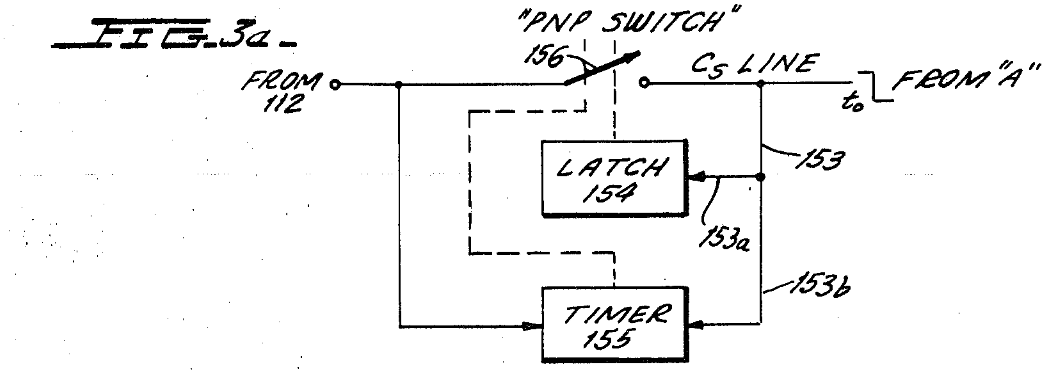
Figure 3B:
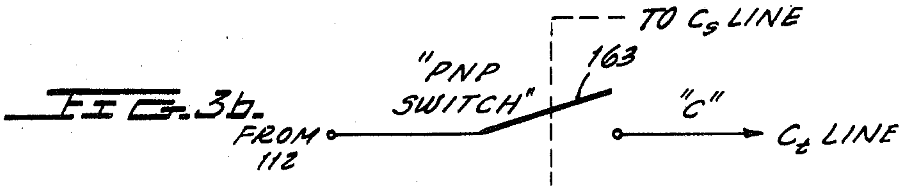
Figure 3C:
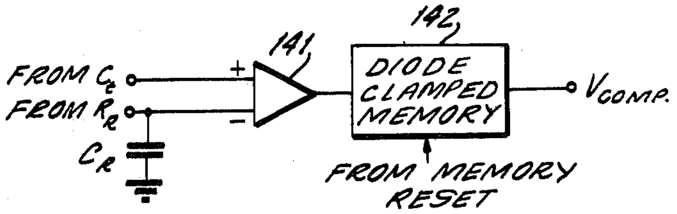
Figure 3D:
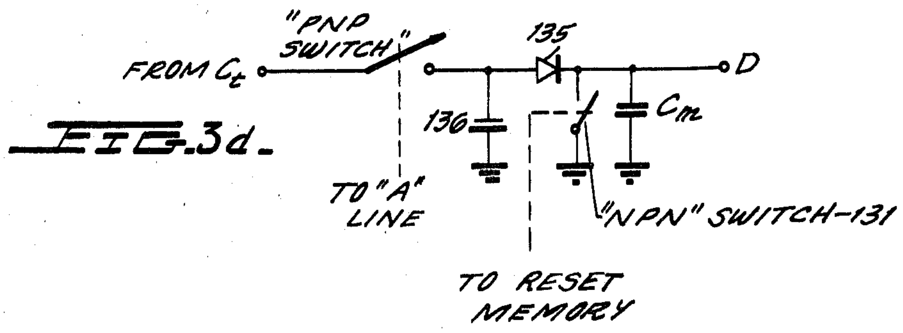

The above objects, features and advantages of the instant invention along with other objects, features and advantages will become apparent upon a reading of the following description of one preferred embodiment of the instant invention in conjunction with the drawings as follows:

FIG. 1 is a block diagram, partially in schematic form, of the time delay setter and time delay unit of the instant invention;

FIGS. 2*a* to 2*e* are timing diagrams of various voltages of the time delay setter and time delay unit of the instant invention for explaining the time setting operation;

FIG. 3*a* is an equivalent circuit diagram of a gating circuit which may be employed in the $C_s$ Interrogate module of FIG. 1;

FIG. 3*b* is the equivalent circuit diagram of a gating circuit which may be employed in the $C_t$ Interrogate module of FIG. 1;

FIG. 3*c* is the equivalent circuit diagram of an operational amplifier circuit which may be employed in the $C_t$ charge rate comparator module of FIG. 1;

FIG. 3*d* is the equivalent circuit diagram of the $C_t$ memory module; and

Figure 3E:
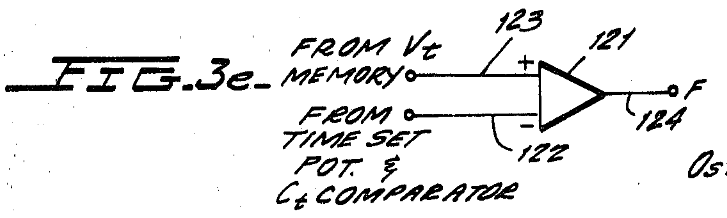

FIG. 3*e* is the equivalent circuit diagram of an operational amplifier circuit which may be employed in the $V_o$ compute module.

Referring to the figures, the general components of the timing system of the instant invention are shown in FIG. 1, in partially schematic and partially block diagram form. The system is essentially comprised of a time delay unit 100 and a time delay setter 110 connected by a breakaway connector 101 and a first movement switch $S_1$.

The first movement switch $S_1$ is usually operated shortly before the time delay unit 100 is to be separated from the time delay setter 110 by action of the time delay unit in beginning to move away from the setter. This electrically connects the time delay unit 100 to the time delay setter 110 momentarily. The time delay setter 110 then interrogates the time delay unit 100, in a manner to be further explained hereinafter, to determine its parameters. The time delay setter 110 then imposes initial conditions on the time delay unit 100 based upon these parameters and upon a predetermined time delay set in the time delay setter 110. The time delay of unit 100 is now set, typically within 20 milliseconds after closure of $S_1$, and after the breakaway of unit 100 from the time delay setter 110, the unit 100 responds in the predetermined time delay to provide an operating output signal.

The time delay unit consists of a voltage trigger stage 102, a constant current source 103 and a pair of capacitors $C_s$ and $C_t$. The voltage trigger stage 102 connects the capacitor $C_s$ to the output load when the capacitor $C_t$ has reached a predetermined charge voltage designated $V_t$. Stage 102 is connected to the capacitor $C_t$ and the constant current source 103 by means of leads 104, 105 and 106. The constant current source 103 is connected between leads 104 and 105 and the capacitor $C_t$ is connected between leads 105 and 106. The capacitor $C_t$ is in the trigger circuit of the voltage trigger stage 102 so that when the capacitor $C_t$ is charged to a sufficient voltage the voltage trigger stage 102 is caused to produce an output pulse. The capacitor $C_s$ is connected to leads 104 and 106 across the series connection of the constant current 103 and capacitor $C_t$. Since the capacitor $C_s$, constant current source 103 and the capacitor $C_t$ are connected in a complete circuit, upon the disconnection of the time delay units 100 from the time delay setter 110, the capacitor $C_t$ is charged to the trigger voltage at an accurately established constant charging rate from capacitor $C_s$ through the constant current source 103. Since the charging rate is accurate and constant for all time delay units, the time it takes to reach the trigger voltage is determined by the initial voltage ($V_o$) on the capacitor $C_t$, the value of $C_t$ and the value of the trigger voltage ($V_t$).

The time delay setter 110 includes a plurality of modules having the functions of establishing the time delay to be set in the time delay unit and calculating the parameters of the various elements in the time delay unit 100 so as to compensate for any variations between these parameters and the nominal parameters of the elements of the time delay setter 110 and uopn which the selector of the time delay setter 110 is calibrated.

The time delay setter 110 has a time set potentiometer or selector 111, a well regulated and reference power supply 112, a $V_o$ compute module 120, a $V_t$ memory 130, a $C_t$ charge rate comparator 140, a $C_s$ interrogate and charge circuit module 150, a $C_t$ interrogate module 160, a memory reset 170 and a $V_o$ charge initiate module 180.

The time set potentiometer 111 is calibrated and has a dial (not shown) for selecting the time delay to be imposed on the time delay unit 100. The time set potentiometer 111 is powered by the regulated power supply 112. The time set potentiometer 111 is connected to a $V_o$ compute module 120 through resistor $R_{11}$ of a voltage divider consisting of resistors $R_{11}$ and $R_{12}$ and through a lead 113. The function of the $V_o$ compute module 120 is to determine the initial charge to be placed on the capacitor $C_t$ of the time delay unit 100 so that upon breakaway the constant current source 103 of the time delay unit 100 will charge the capacitor $C_t$ to the trigger voltage of the voltage trigger stage 102 in the time set by the time set potentiometer 111. This is done in a manner further to be explained hereinafter.

Also connected to the $V_o$ compute module are the various modules of the time delay setter 110 which determine the parameters of the time delay unit 100 so that the $V_o$ or initial voltage may be properly determined. These modules include a $V_t$ memory 130 and a $C_t$ charge rate comparator 140. The $V_t$ memory 130 determines the trigger voltage $V_t$ of the voltage trigger stage 102 of the time delay unit 100, as to be further explained hereinafter. The $V_t$ memory 130 feeds this information as a voltage to the $V_o$ compute module 120 through resistor R13.

The $C_t$ charge rate comparator 140 compares the value of capacitor $C_t$ of the time delay unit 100 with a nominal capacitor in the $C_t$ charge rate comparator, as to be explained hereinafter. This information is fed from the $C_t$ charge rate comparator 140 through lead 114, resistor $R_{12}$ and lead 113 to the $V_o$ compute module 120 to compensate for the variation in $C_t$ from the nominal capacitor of the $C_t$ charge rate comparator 140 in the determination of the $V_o$ or initial voltage to be placed on the capacitor $C_t$.

The time delay setter 110 also includes a $C_s$ Interrogate and charge circuit module 150, a $C_t$ Interrogate module 160, a memory reset module 170 and a $V_o$ charge initiate module 180. The $C_s$ Interrogate and charge circuit module 150 is employed for the purposes of determining the parameters of the time delay units 100 and conditioning the time delay setter 110 for reception of this information, as to be further explained hereinafter. The memory reset module 170 is employed to erase any information which may exist in the $V_t$ memory 130 or $C_t$ charge rate comparator 140 from a previous connection to another time delay unit. The $V_o$ charge initiate module 180 is employed for resetting the time delay unit 100 after its parameters have been determined as to be explained hereinafter.

The operation of the time delay setter 110 and the time delay unit 100 will now be given as the sequence of events which would take place upon the use of the system of the instant invention. In addition to FIG. 1 reference will now be had to FIGS. 2 and 3*a*–3*e* which show the timing diagrams of the various voltage conditions and more detailed circuitry of the various modules of FIG. 1. Initially the time delay unit 100 and the time delay setter 110 are connected by means of breakaway connector 101. The breakaway connector may be any suitable connecting device capable of connecting electrical conductors and capable of easily disconnecting the electrical conductor upon a slight physical pull. Terminals 104, 105 and 106 of the time delay unit 100 are connected respectively to sections A, B and C of the breakaway connector 101. Sections A and B of the breakaway connector 101 serve to connect terminals 104 and 105 respectively to poles 115 and 116 of first movement switch $S_1$ and section C of breakaway connector 101 serves to connect terminal 106 to ground through conductor 117.

Figure 2A:
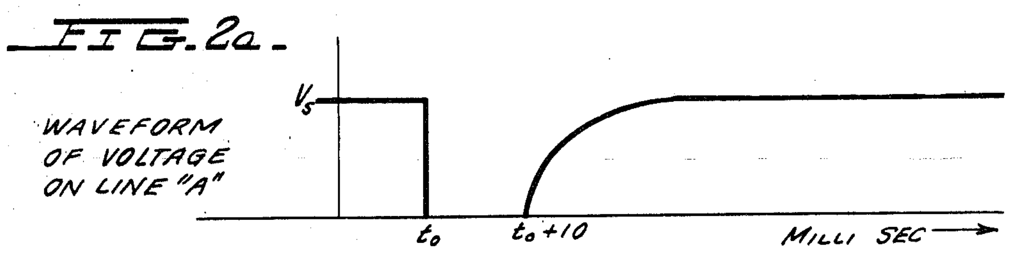
Figure 2B:
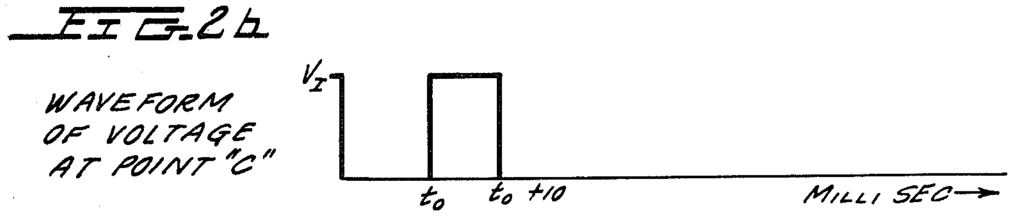
Figure 2C:
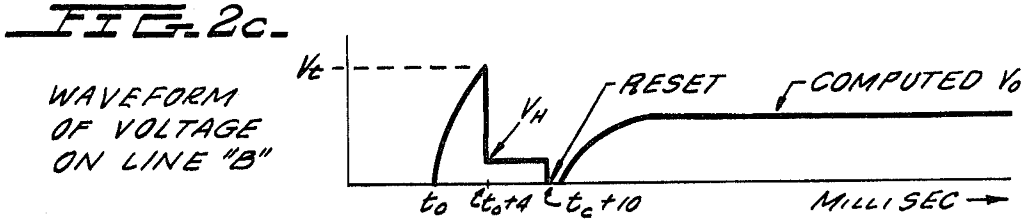

Prior to activation, the first movement switch $S_1$ is open and the $C_s$ and $C_t$ capacitors of the time delay unit 100 are uncharged. In the time delay setter 110, the conductor A connected to pole 118 of first movement switch $S_1$ has a D.C. voltage $V_s$ on it applied through the $C_s$ Interrogate and Charge circuit module 150 and resistor $R_s$. This voltage is shown in FIGURE 2*a* before the time $t_o$. Also at this time the voltage on conductor B which is connected to pole 119 of first movement switch $S_1$ is zero as shown in FIG. 2*c* before the time $t_o$.

In order to condition the time delay unit 100 to produce an output voltage at its output terminal 102*a* with precisely the time delay set by the time set potentiometer 111, the switch $S_1$ is closed by the act of "dropping" the timer unit 100 (or by equivalent means). The act of "dropping" occurs at time $t_o$ on the timing diagram of FIG. 2 for the purpose of explanation. Upon the closure of the switch $S_1$ and particularly the pole 118, the voltage on conductor A is dropped to zero as a result of the uncharged initial state of the capacitor $C_s$. This is shown in FIG. 2*a* at time $t_o$. The negative leading edge of the voltage drop on conductor A is fed back to the $C_s$ Interrogate and Charge module 150 through leads 151, 152 and 153 to cut off the charging circuit of capacitor $C_s$ for a short period of time (typically less than 10 milliseconds). The operation of the $C_s$ Interrogate and Charge circuit module 150 can be seen more clearly in FIG. 3*a*. At time $t_o$ the negative leading edge on conductor A produces a negative pulse on conductors 151, 152 and 153 which operates the latch 154 to cut off or open PNP switch 156. Also at $t_o$ the negative leading edge is fed as a negative pulse to timer 155 which operates at the end of, say, 10 milliseconds to turn the PNP switch 156 on again. When the PNP switch is turned on again by the timer 155 is automatically latches on by the existence of an output voltage at the output terminal of the PNP switch.

Also at $t_o$ the negative leading edge on conductor A is fed through conductors 151, 152, 161 and 162 to the $C_t$ Interrogate module 160 which may be a PNP switch, the equivalent circuit of which is shown in FIG. 3*b*. The PNP switch of the $C_t$ Interrogate module is normally kept open by the voltage on the A conductor. When the A conductor voltage goes to zero for 10 milliseconds the PNP switch 163 of the $C_t$ Interrogate module shorts producing a pulse at point C from the voltage supply 112. The voltage on point C is shown in FIG. 2*b*.

Figure 2D:
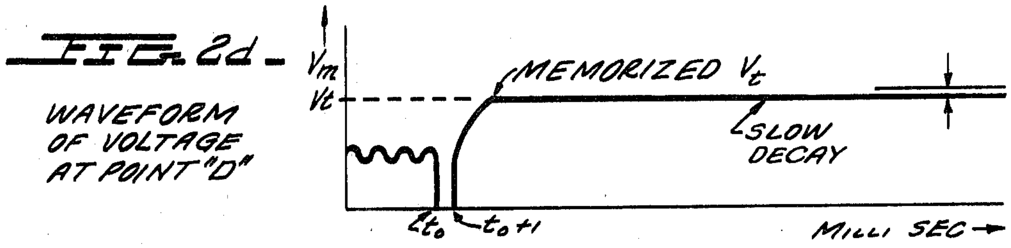
Figure 2E:
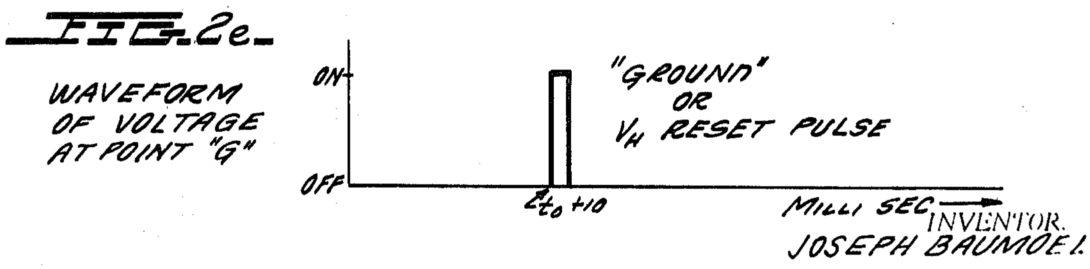

The negative leading edge of the voltage on conductor A at $t_o$ is also applied to the memory reset module 170 through conductors 151, 152, 161 and 171. The memory reset module 170 may be a one millisecond monostable multi-vibrator which produces an output pulse of one millisecond to reset the $V_t$ memory module 130 by closing the NPN switch 131 to short circuit the memory capacitor $C_m$ as shown in FIG. 3*b*. The reason for discharging the memory capacitor $C_m$ is to remove any voltage which may remain on such memory capacitor from a previous interrogation. The voltage on capacitor $C_m$ is shown in FIG. 2*d*.

At $t_o$ the voltage from the $C_t$ Interrogate module 160 charges capacitor $C_t$ in the time delay unit 100 through the resistor $R_t$ the B conductor, closed switch $S_1$, section B of breakaway connector 101 and conductor 105. The time constant of the charging circuit is $R_t C_t$. The voltage across capacitor $C_t$ is shown in FIG. 2*c* also at $t_o$ the voltage at point C charges the capacitor $C_r$ of the $C_t$ charge rate comparator 140 as shown in FIG. 3*c* with a time constant of $R_rC_r$. The waveform of the voltage across capacitor $C_r$ very closely resembles the voltage of FIG. 2*c* across capacitor $C_t$ The capacitor $C_t$ continues to charge until the voltage across this capacitor is equal to $V_t$, the trigger voltage of the voltage trigger stage 102. When the trigger voltage is reached there is a drop in voltage on the trigger terminal 105 (as shown at a time of approximately $t_o+4$ milliseconds in FIG. 2*c*) and an output pulse is produced by the voltage trigger stage on terminal 102*a*.

The voltage $V_t$ on the conductor B is fed back to the $V_t$ memory 130 through conductors 132 and 133 to be stored on memory capacitor $C_m$ as shown in FIG. 3*b*. (The voltage on $C_m$ being shown in FIG. 2*d*.) This $V_t$ memory capacitor $C_m$ memorizes the trigger voltage of the voltage trigger stage so that it may be used in determining the initial voltage which may be placed upon the capacitor $C_t$ for the desired time delay, as to be explained hereinafter. The $V_t$ memory module 130 includes a PNP switch which is shorted when the A conductor goes to ground at $t_o$ so that the voltage from $C_t$ charges the memory capacitor $C_m$ through the diode 135 to the $V_t$. When the voltage on the trigger terminal 105 drops to $V_h$ the holding voltage (see FIG. 2*c*) of the voltage trigger stage 102, the voltage on the memory capacitor $C_m$ remains at $V_t$ since the diodes 135 then becomes back biased as a result of connection to bias source 136 which may be obtained from the power supply 112. As shown in FIG. 2*d* there is a slight decay of the memorized voltage due to leakage through resistor $R_{13}$. However, this decay is reduced to a minimum since the resistor $R_{13}$ is made very high.

Referring to FIG. 3*c* which shows the equivalent circuit of the charge rate comparator 140 at time $t_o$ the voltage across $C_t$ and $C_r$ are fed to an operational amplifier 141 having plus and minus input terminals. If $C_t$ is larger than $C_r$, $C_r$ being an extremely accurate stable reference capacitor, the voltage on the plus amplifier input will rise more slowly than on the minus input, and vice versa. The difference between the voltages on the plus and minus input terminals appears at the output of the amplifier on conductor 114 and represents a function of the difference between $C_r$ and $C_t$. The instant that the $C_t$ voltages reaches the $V_t$, the difference between the voltages on $C_t$ and $C_r$ is exactly equal to the voltage that should be subtracted or added to $V_o$ to compensate for the $C_t$ capacitance charging rate error for the longest settable time, as to be explained hereinafter. The output from the $C_t$ charge rate comparator 140 is fed through conductor 114 and the voltage divider comprised of resistors $R_{11}$ and $R_{12}$ ganged to the time set switch of the time set potentiometer 111 to reduce the correction voltage proportional to the time setting of the time set potentiometer 111. The ouput circuit of the $C_t$ charge rate comparator 140 includes a simple diode clamped memory 142 which preserves the correction voltage until $V_o$ is computed by the $V_o$ compute module 120.

Summarizing then to this point the $V_o$ compute module 120 is supplied with the following information:

(1) A voltage representative of the desired time delay as set by the time set potentiometer 111 which voltage is fed to the $V_o$ compute module 120 by the voltage divider consisting of resistors $R_{11}$ and $R_{12}$ and by the conductor 113;

(2) The timer trigger voltage $V_t$ necessary to trigger the voltage trigger stage 102 of the time delay unit 100 which is fed from the $V_t$ memory module 130 through resistor $R_{13}$ to the $V_o$ compute module;

(3) The compensation voltage $V_c$ based on the difference in value of the $C_t$ capacitor in the time delay unit 100 and the $C_r$ nominal capacitor in the time delay setter 110 which is fed from the $C_t$ charge rate comparator 140 through conductor 114, the voltage divider consisting of resistors $R_{12}$, $R_{11}$ and the time set potentiometer 111 and through the conductor 113 to the $V_o$ compute module.

The above information is fed to a differential operational amplifier 121 shown in FIG. 3*e* of the $V_o$ compute module. The information numbered (1) and (3) above are fed to the negative terminal 122 of the operational amplifier 121 and the information numbered (2) above is fed to the positive terminal of the operational amplifier 121. The operational amplifier then solves the following equation:

$$V_o = V_t - T_d\left(\frac{dv}{dt}\right) \pm V_c$$

where:

$V_o$ equals the desired initial voltage on $C_t$ at the moment of breakaway of the time delay unit 101 from the time delay setter 100;

$V_t$ equals the timer trigger voltage of the voltage trigger stage 102;

$T_d$ equals the desired time delay set by the time set potentiometer 112;

*dv/dt* equals the nominal timer charge rate based on the nominal capacitor $C_t$ and the nominal timer charging current $$\left(\text{i.e., } \left.\frac{dv}{dt}\right|_{nom} = \frac{i_{nom}}{C_{t\ nom}}\right)$$

$V_c$ equals the necessary compensation voltage based on the difference in value of $C_t$ and $C_r$.

As can be seen from the above definition the function $$T_d \frac{dv}{dt}$$

is equal to the voltage to which the capacitor $C_r$ would charge in a time $T_d$. If the last term of the equation $V_c$ were equal to zero as a result of $C_t$ and $C_r$ being equal. It is obvious that in order for the capacitor $C_t$ to reach a voltage of $V_t$ in a time of $T_d$ an initial voltage $V_o$ equal to the difference between the trigger voltage $V_t$ and the voltage to which the capacitor would charge in a time $T_d$ would have to be placed on the capacitor $C_t$ before the start of the timing period. This voltage would equal $$T_d \frac{dv}{dt}$$

where the capacitors $C_t$ and $C_r$ do differ than it is necessary to provide the compensation voltage $V_c$. This compensation voltage is determined by the equation:

$$V_c = V_{comp} \frac{T_d}{T_d \text{ max.}}$$

where:

$V_{comp}$ equals the output voltage on lead 114 from the operational amplifier 141 of the $C_t$ charge rate comparator 140;

$T_d$ is the time delay set by the time set potentiometer 111;

$T_d$ max. is the maximum time delay that can be set by the time set potentiometer 111; and $V_c$ equals the compensation voltage.

The voltage $V_o$ determined by the $V_o$ compute module 120 is now to be applied to the capacitor $C_t$ in the time delay unit 100 through conductor 124, resistor $R_c$, conductor 125, the B conductor, switch $S_1$, section B of the break-away connector 101 and conductor 105 of the time delay unit 100. However, immediately before the $V_o$ voltage is applied to the capacitor $C_t$ the $V_o$ charge initiator module 180 which may be a 1 millisecond monostable multivibrator is triggered by the positive going pulse on the A conductor at the end of the 10 millisecond time period of the C interrogate and charge circuit 150. This positive edge is fed to resistor $R_s$, conductor 151, conductor 181, to the $V_o$ charge initiate module 180. The 1 millisecond pulse from the $V_o$ charge initiate module 180 is a ground pulse shown in FIG. 2*e* and serves to reset the voltage trigger stage 102 of the time delay unit 100 and to discharge the capacitor $C_t$ so as to prepare the capacitor $C_t$ for receiving the $V_o$ voltage from the $V_o$ compute module 120 and so as to prepare the voltage trigger stage 102 to be triggered after the time delay unit 100 is separated from the time delay setter 110.

Upon separation of the time delay unit 100 from the time delay setter 110 as a result of the disconnection at the break-away connector 101 the voltage on the capacitor $C_t$ increases with time since it is being charged at a constant rate from the capacitor $C_s$ through the constant current source 103. Since the timer 100 has an accurately established charging rate and since any variations which may exist in $V_t$ and $C_t$ from unit to unit have been compensated for in the initial charging of the capacitor $C_t$ to the voltage $V_o$, the time delay unit 100 will time out in the set time delay period $T_d$ to produce an output voltage at the terminal 102*a*.

As can be seen from the above description, the examination of the parameters of the particular time delay unit 100 takes place within a few milliseconds (typically 10 to 12 milliseconds) after the first movement switch $S_1$ has been closed and the necessary initial voltage is imposed on the capacitor $C_t$ to compensate for the variations in these parameters from the reference parameters. Since it usually takes approximately 30 milliseconds for separation after the first movement switch $S_1$ has been closed the above described time delay setter and time delay unit operate well within the permitted time period.

With the above described time delay setter it is possible to accurately and selectively set the time delay period of time delay units without any error resulting from the variations of the parameters from unit to unit, since such variations are calculated and compensated for by the time delay setter. It is therefore possible to use the time delay setter with a plurality of different time delay units and under varying conditions which might otherwise change the characteristics of the particular parameters of the time delay units. This is particularly important in aircraft for such things as parachute openers, sonobuoys and military stores since temperature variations might otherwise seriously effect the selected time delay by varying the parameters of the electrical components of the time delay units.

While the time delay setter of the instant invention has been particularly described with respect to use with a separable time delay unit and a break-away connector it is clear that by utilizing the basic interrogation and setting techniques described herein together with appropriate state of the art circuits to produced time spaced pulses or controlled frequency signals of various wave shapes, the time delay setter of the instant invention may be used in non-droppable devices such as intervalometers, etc.

While the instant invention has been described with respect to a preferred embodiment thereof numerous modifications and variations within the spirit and scope of the invention will now become apparent to those skilled in the art. It is therefore preferred that the scope of this invention be limited not by the specific disclosure herein but only by the appended claims.

The embodiments of the invention in which an exclusive privilege or property is claimed are defined as follows:

1. A time delay setter for selectively establishing a time delay within an individual, associated time delay device having a characteristic time delay of its own which is subject to variation under changing environmental conditions and which differs from device to device as a result of ranges of permissible fabrication tolerances established during its manufacture comprising:

first means for determining the circuit parameters of said individual device which bear on the time delay initially exhibited thereby;

second means for predeterminedly selecting the time delay to be established for said device in accordance with a function to be performed;

third means connected to said first and second means for computing and generating an initial condition signal as a function both of said determined circuit parameters of said individual device employed in providing its exhibited time delay and of said time delay required to perform said desired function; and means connected to said third means for providing said initial condition signal as an input signal to said individual time delay device to correct the time delay initially exhibited thereby to conform to that delay required in the performance of said function.

2. The time delay setter as set forth in claim 1 wherein said first means includes a reference timing circuit having predetermined reference parameters, means for comparing said parameters of said time delay device to said reference parameters, and means for producing an electrical signal representative of the difference between said compared parameters; said second means including means for producing an electrical signal representative of said time delay based on said reference parameter of said time delay setter; and said computing means including means responsive to said electrical signal representative of the difference between said compared parameters for compensating for said difference in computing said initial conditions.

3. The time delay setter as set forth in claim 2 for selectively setting the time delay of a time delay device having a voltage triggered means, a capacitor connected to said voltage means and a charging source for charging said capacitor whereby said voltage triggered means is triggered to produce an output when said capacitor is charged to the triggering voltage of said voltage triggered means; said first means including means for determining said triggering voltage; and said reference timing circuit including a reference capacitor to be compared to said capacitor in said time delay device.

4. The time delay setter as set forth in claim 3 wherein said means for determining said triggering voltage includes a memory means for storing said determined triggering voltage to be read out to said computing means.

5. The time delay setter as set forth in claim 4 wherein said comparing means includes an operational amplifier; an interrogating means in said time delay setter electrically connected to said reference capacitor and to said capacitor in said time delay device when said time delay setter is connected to said time delay device for simultaneously charging said capacitors; said operational amplifier having first and second input terminals respectively electrically connected to said reference capacitor and said capacitor in said time delay device during said simultaneous charging and having an output terminal which produces a voltage equal to the difference of the voltages on said capacitors when said capacitor in said time delay device is charged to said triggering voltage; said difference voltage being the voltage necessary to compensate for the difference between said capacitor in said time delay device and said reference capacitor when said time delay is set at a maximum by said second means.

6. The time delay setter set forth in claim 5 further including means in said second means electrically connected to said output terminal of said operational amplifier and to said computing means for applying a voltage to said computing means which is equal to the voltage necessary to compensate for the difference between the capacitor in said time delay device and said reference capacitor for the particular time delay set by said second means.

7. The time delay setter set forth in claim 6 wherein said computing means includes means responsive to said electrical signal from said second means representative of said time delay based on said reference parameters, said memorized triggering voltage and said voltage necessary to compensate for said difference in said capacitor for said particular time delay set for producing an initial voltage to be imposed upon said capacitor in said time delay device and thereby establish said selected time delay of said time delay device.

8. The combination of a time delay setter and an individual time delay unit for producing a predetermined time period after separation of said time delay unit from said time delay setter, where said time delay unit has a characteristic time delay of its own which is subject to variation under changing environmental conditions and which differs from device to device as a result of ranges of permissible fabrication tolerances established during its manufacture, said time delay setter comprising:

first means for selectively setting in accordance with a function to be performed, said predetermined time period in which said time delay unit is to produce said response after separation;

second means for determining the circuit parameters of said individual unit which bear on the time delay initially exhibited thereby;

third means connected to said first and said second means for computing initial conditions to be imposed upon said individual unit to correct the time delay initially exhibited thereby so that said unit produces said response after the time delay required to perform said function and in said predetermined time period after separation.

9. The combination as set forth in claim 8 wherein said time delay unit includes:

a voltage triggered means responsive to a predetermined triggering voltage to produce said predetermined response;

a charging means; and a capacitor connected to said charging means and said triggered means;

said charging means responsive to separation of said time delay unit from said time delay setter to charge said capacitor to said triggering voltage at a constant rate to cause said voltage triggered means to be triggered in said predetermined time period.

10. The combination as set forth in claim 9 wherein said second means includes means for determining said triggering voltage and means for memorizing said triggering voltage.

11. The combination as set forth in claim 10 wherein said second means further includes:

a reference capacitor, said first means being calibrated to produce a voltage representative of said period with said reference capacitor charging rate as a standard;

means for charging said reference capacitor and said capacitor in said time delay unit simultaneously;

means electrically connected to said capacitors during said simultaneous charging for comparing said capacitors and for producing an output voltage when said capacitor in said time delay unit reaches said triggering voltage which is representative of the difference between said capacitors and which is equal to the voltage necessary to compensate for said difference when said time period is set at a maximum;

said third means including means responsive to said voltage representative of said set period, said compensating voltage and said memorized triggering voltage for computing the initial voltage to be placed on said capacitor of said time delay unit to produce said response said predetermined time after separation.

12. A time delay setter and time delay unit for use in parachute openers, and the like, said time delay setter and said time delay unit being connectable by a break-away switch and said time delay unit responsive to separation from said time delay setter by said break-away switch to produce a predetermined response after a time delay set by said time delay setter, in which said time delay unit has a characteristic time delay of its own which is subject to variation under changing environmental conditions and which differs from device to device as a result of ranges of permissible fabrication tolerances established during its manufacture said time delay unit comprising:

a voltage triggered means responsive to a predetermined triggering voltage to produce said predetermined response;

a capacitor connected to said voltage triggered means;

a charging means connected to said capacitor and said break-away switch and responsive to said separation to charge said capacitor at a constant rate to said triggering voltage;

said time delay setter comprising:

first means for selectively setting in accordance with the function to be performed said time delay to be established for said time delay unit and for producing a voltage representative of said time delay based upon the charging rate of a reference capacitor;

second means electrically connectable to said break-away switch before separation for determining said triggering voltage and memorizing said triggering voltage;

third means including said reference capacitor electrically connectable to said capacitor in said time delay unit for comparing said capacitors and producing a voltage representative of the difference between said capacitors;

fourth means connected to said first means and said third means for producing a compensating voltage to compensate for said difference between said capacitors;

computing means and said fourth means and responsive to said voltage produced by said first means, said memorized triggering voltage, and said compensating voltage to provide the initial voltage necessary to charge said capacitor in said time delay unit so that said capacitor is charged to said triggering voltage in said time delay after said separation; and means connected to said computing means and to said break-away switch to charge said capacitor in said time delay unit to said initial voltage before said separation.

References Cited

UNITED STATES PATENTS

| | | | |
|---|---|---|---|
| 2,404,553 | 7/1946 | Wales, Jr. | 102—70.2 |
| 2,450,460 | 10/1948 | Thomson | 328—129X |
| 3,343,493 | 9/1967 | Aulds et al. | 102—70.2 |

STANLEY D. MILLER, Jr., Primary Examiner

U.S. Cl. X.R.

102—70.2; 244—150; 307—141, 293; 317—142